Figure 1:
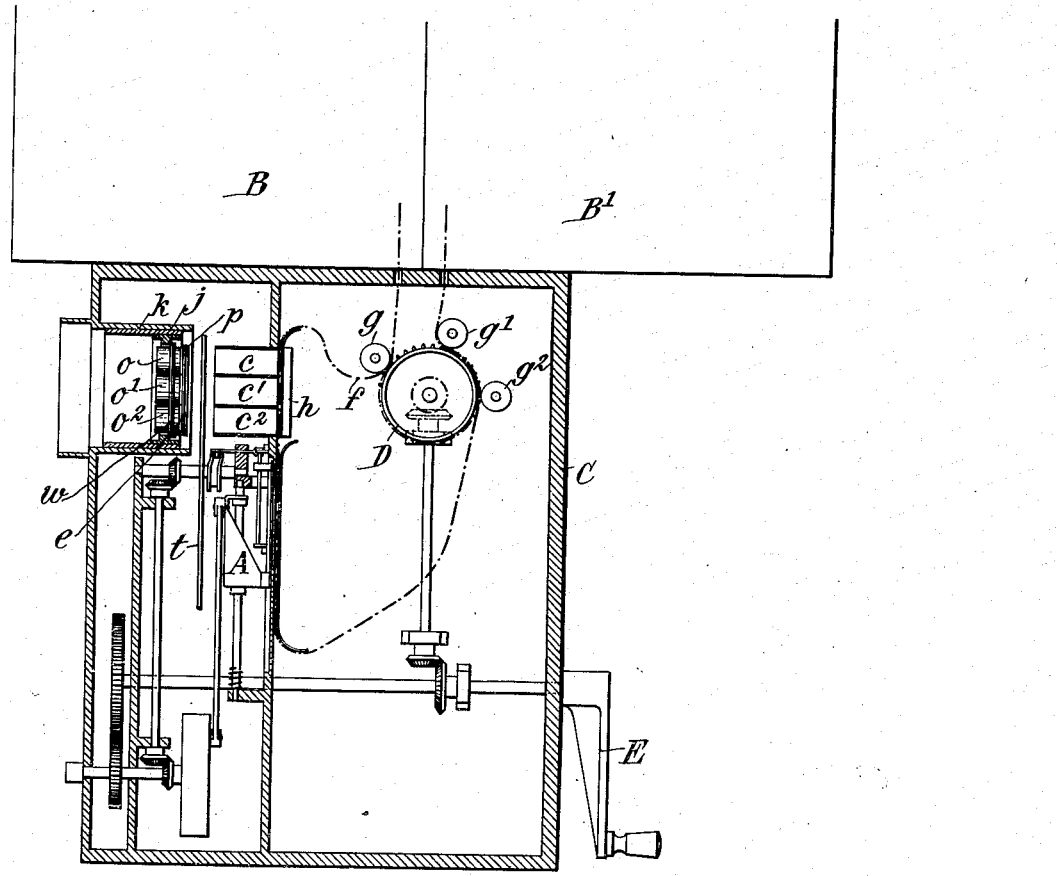

L. GAUMONT.
APPARATUS FOR TAKING CINEMATOGRAPHIC VIEWS IN COLORS.
APPLICATION FILED JULY 26, 1913.

1,213,184.

Patented Jan. 23, 1917.
2 SHEETS—SHEET 1.

WITNESSES:

INVENTOR:
Léon Gaumont
By Attorneys,

L. GAUMONT.
APPARATUS FOR TAKING CINEMATOGRAPHIC VIEWS IN COLORS.
APPLICATION FILED JULY 26, 1913.
1,213,184.
Patented Jan. 23, 1917.
2 SHEETS—SHEET 2.
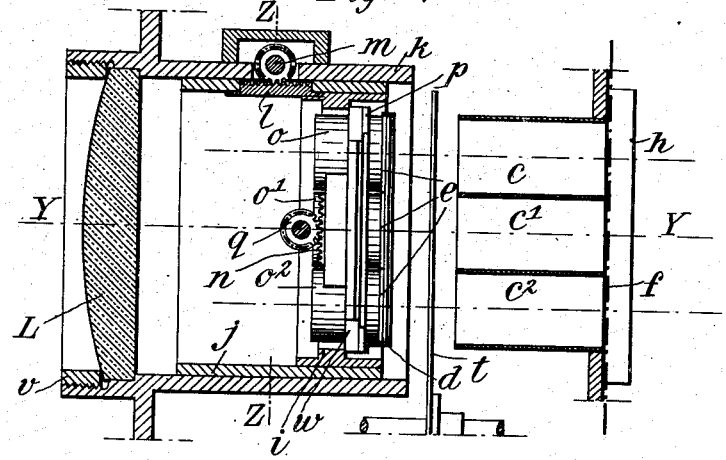
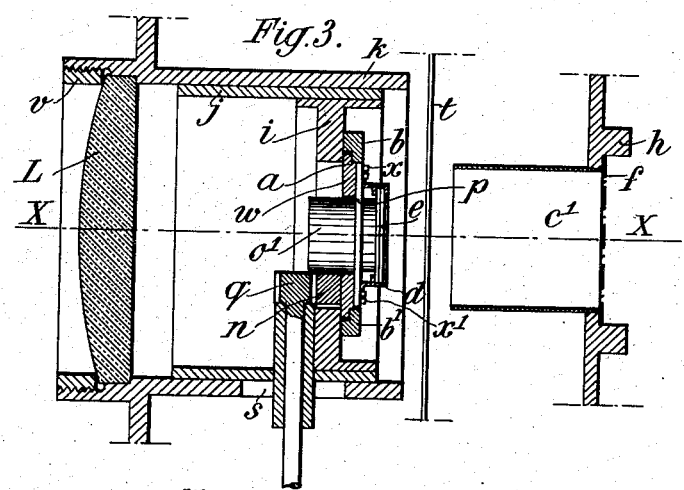
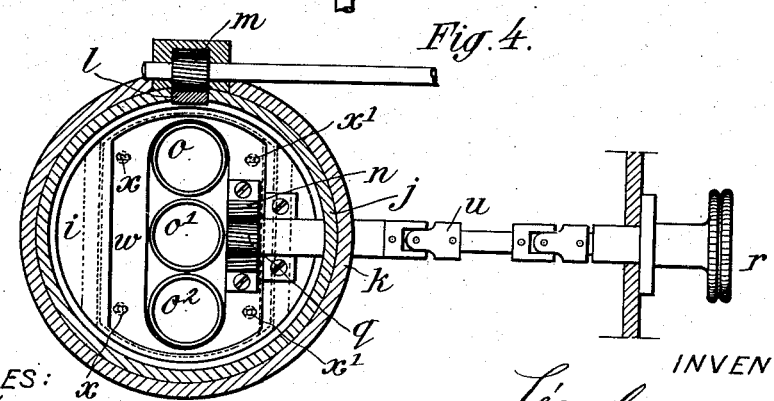
WITNESSES:
INVENTOR:
Léon Gaumont
By Attorneys,

UNITED STATES PATENT OFFICE.

LÉON GAUMONT, OF PARIS, FRANCE, ASSIGNOR, BY MESNE ASSIGNMENTS, TO EASTMAN KODAK COMPANY, OF ROCHESTER, NEW YORK, A CORPORATION OF NEW YORK.

APPARATUS FOR TAKING CINEMATOGRAPHIC VIEWS IN COLORS.

1,213,184. Specification of Letters Patent. Patented Jan. 23, 1917.

Application filed July 26, 1913. Serial No. 781,367.

*To all whom it may concern:*

Be it known that I, LÉON GAUMONT, a citizen of the Republic of France, residing in Paris, France, have invented certain new and useful Improvements in Apparatus for Taking Cinematographic Views in Colors, of which the following is a specification.

The present invention has for its object an apparatus for taking upon a single film cinematographic pictures in groups of three arranged one above the other by the three-color process, the pictures of one group being taken respectively through the different colored fundamental screens used in the three color process. This apparatus is mainly characterized by the fact that its three-objective optical system forms a unit or whole mounted in the apparatus in a displacable manner, its different parts being obtained and regulated in advance in such a manner that the pictures furnished are equal in size and readily superposable during projection, means being provided whereby the plane passing through the optical axes of the three objectives is and always remains perfectly parallel with the direction in which the cinematographic film is displaced; the unit or whole thus constituted is also combined with devices rendering it possible to impart to the unit a movement of longitudinal displacement, in order to obtain the focusing, and a movement of vertical displacement, in order to obtain simultaneously the *décentrement*, i. e., a movement away from their center lines, of the three objectives, the purpose being to enable views, or parts of views, to be recorded upon desired parts of the film, or even to be recorded upon the film at all. This latter capability is of special importance with respect to objects which rise above, or dip below, the horizontal plane of the taking apparatus.

The description of the apparatus which will now be given with reference to the accompanying drawings, given by way of example, which will render the manner in which the invention is carried into practice readily intelligible.

Figure 1 is a general view of the apparatus, in elevation and in section on the median vertical plane of the objectives. Fig. 2 is a vertical section on the line $x$—$x$ in Fig. 3 of the optical system alone, showing the position of the shutter and the rear partitions and also the passage of the film and the details of the mechanism for simultaneously adjusting the three objectives. Fig. 3 is a horizontal section at the optical center of the median objective, that is to say on the line Y—Y in Fig. 2. Fig. 4 is a vertical cross section on the line Z—Z in Fig. 2 showing one of the means for actuating the optical system.

The three objectives $o$, $o'$ $o^2$ comprised in the apparatus are fixed upon one and the same plate $p$ in such a manner that their axes occupy the same plane. This plate is mounted upon a frame $w$ the sides of which form a slide in two vertical slideways $b$ $b'$ fixed to a transverse partition $i$ of the socket $j$ which can be slid in the fitting carrying the objective $k$, this partition being provided with an aperture for the passage of these objectives. Screens $e$ respectively corresponding to these three objectives are superposed, to the rear thereof, in a slideway $d$ fixed to the plate $p$. At the rear of this system partitions $c$, $c'$ $c^2$ also respectively corresponding to the three objectives are located. Between the latter and the said partitions the shutter $t$ passes (Figs. 2 and 3); this shutter simultaneously uncovers and screens the three objectives.

The film $f$ passes through a passage $h$ located behind the partitions $c$, $c'$ $c^2$ and is there exposed. The intermittent advance of the film is produced by means of a special device such as that described in my United States Patent #1,084,938, dated Jan. 20, 1914; this device has been represented at A in Fig. 1 of the drawings, but any other device might of course be employed. The film proceeds from the delivery box B to the receiving box B' and is maintained in its passage over a toothed cylinder D by rollers $g$, $g'$ $g^2$. The mechanism, which may be of any convenient kind, which serves to drive the cylinder D and the means for producing the intermittent advance of the film is represented in the box C of the apparatus in Fig. 1. This mechanism is operated by means of the external handle E.

The three objectives $o$, $o'$ $o^2$ fixed to the plate $p$ are not capable of any independent movement. The said objectives form, with their corresponding screens, a unit or whole which is previously contrived and regulated in such a manner that the pictures furnished are equal in size. This assemblage, owing to the method of mounting the plate explained above, is readily removable in a single piece and this arrangement presents the advantage that one optical system can be replaced by another without the necessity for any subsequent adjustment of its various parts.

The plate $p$ is dressed upon one of its lateral faces $a$ in such a manner that it is perfectly parallel with the plane passing through the optical axes of the three objectives. This face $a$ bears against a portion of the face $b$ of the slide-ways which in its formation is dressed so that it is perfectly parallel with the direction of displacement of the cinematographic film. The plate is fixed to the edges of the frame $w$ by means of screws $x$, $x'$ passing through horizontally ovalized holes formed in this plate so that it is possible to apply the dressed lateral face $a$ of the latter exactly against the dressed portion of the slideway $b$, while a certain amount of play is left between the other lateral face of the plate and the second slideway $b'$, in such manner that when the unit or whole constituting the optical system is assembled, it is only necessary to bring the face $a$ of the plate in contact with the dressed portion of the slideway $b$ in order that the plane passing through the optical axes of the three objectives may be automatically located parallel with the said direction of displacement of the cinematographic film; as soon as the screws $x$, $x'$ have been tightened, the said assemblage will always preserve this position when the frame $w$ is displaced in the slideways $b$ $b'$.

The optical system as a whole can be given two movements.

1. A movement of longitudinal displacement by means of a rack 1, integral with the socket $j$, and a pinion $m$ meshing with this rack through an aperture provided in the fitting $k$ (Figs. 2 and 4). This movement permits of simultaneously focusing the three objectives, the focusing of course varying with their distance from the objects to be photographed.

2. A movement of vertical displacement by means of a pinion $q$ and of a rack $n$ integral with one of the sides of the frame $w$ which then moves in its slideways carrying the plate with it. The pinion $q$ is operated by means of a knob $r$ outside the box by the intermediary of Cardan joint elements $u$ which pass through the walls of the box C and of the fitting $k$, the latter through an elongated aperture $s$ shown in Fig. 3, permitting of the displacement of the socket $j$ when the longitudinal movement previously referred to takes place. This vertical movement of the optical system permits of simultaneously centering the three objectives relatively to the fixed frame of the passage through which the cinematographic film passes behind the partitions.

For focusing objects very close to the camera the objectives can be left in a fixed position which corresponds to a sharp picture for the infinite in which case additional lenses L are employed. These lenses are detachably mounted in front of the objectives, their diameter being such that they cover the whole of said objectives. The lens L used in each case is of a focal length equal to the distance of the object and is held in place by means of a threaded ring $v$.

What I claim is:—

1. In an apparatus for taking cinematographic pictures upon a single film by the three-color process, the combination, of an inclosure for a sensitized film, an optical system comprising three objectives constituting a unit or whole mounted removably in the apparatus and adapted to furnish pictures equal in size on the film, guiding means for said unit adapted to hold said unit in such position that a plane passing through the optical axes of the three objectives shall be parallel to the plane in which the film is displaced at the film gate, means for simultaneously centering the three objectives with respect to the object, or portion of the object and the image which it is desired to photograph on the film, and means for simultaneously focusing the three objectives.

2. In an apparatus for taking cinematographic pictures upon a single film by the three color process, the combination, of an inclosure for a sensitized film, an optical system constituting a unit or whole adapted to furnish pictures equal in size upon the film and comprising three objectives, a common removable plate, on which said objectives are fixed, three screens respectively corresponding to said objectives and adapted to move therewith, a slideway adapted to hold said unit in such position that a plane passing through the optical axes of the three objectives shall be parallel to the plane in which the film is displaced at the film gate, means for simultaneously centering the three objectives with respect to the object, or portion of the object and the image which it is desired to photograph on the film, and means for simultaneously focusing the said three objectives.

3. In an apparatus for taking cinematographic pictures upon a single film by the three-color process, the combination of an inclosure for a sensitized film, an optical system constituting a unit or whole adapted to furnish pictures equal in size upon the film and comprising three objectives, three corresponding screens in line with the objectives, a common plate upon which said objectives are fixed, said plate having one side face dressed parallel with the plane passing through the axes of the three objectives, a frame upon which the plate is detachably fixed by means of screws passing through horizontally ovalized holes in the said plate; vertical slideways adapted to receive the sides of the frame one of which slideways presents a portion against which the dressed face of the plate bears, this portion being dressed absolutely parallel with the plane in which the film is displaced at the film gate while the other slideway permits of a certain amount of play between itself and the said plate; means for vertically moving said frame in said slideways in order to simultaneously center the three objectives with respect to the object, or portion of the object and the image which it is desired to photograph on the film, and means for simultaneously focussing the three objectives.

4. In an apparatus for taking cinematographic pictures upon a single film by the three-color process, the combination of an inclosure for sensitized film, an optical system forming a unit or whole adapted to furnish pictures equal in size upon the film, and comprising three objectives, three corresponding screens in line with the objectives, a common plate upon which said objectives are fixed, said plate having one side dressed parallel with the plane which passes through the axes of the three objectives, a frame upon which the plate is detachably fixed by means of screws passing through horizontally ovalized holes in the said plate, vertical slideways adapted to receive the sides of the frame one of the sides of said slideways presenting a portion against which the dressed face of the plate bears, this portion being itself dressed perfectly parallel with the plane in which the film is displaced at the film gate, while the other slideway permits of a certain amount of play between itself and the said plate, a rack integral with one of the sides of the frame, a pinion meshing with this rack for sliding the frame in the slideway and simultaneously centering the three objectives on the film, a flexible shaft passing through the fitting carrying the objectives and the casing of the apparatus for operating the said pinion from the exterior by means of a knob, and means for simultaneously focussing the three objectives.

5. In an apparatus for taking cinematographic pictures upon a single film by the three color process, the combination of an inclosure for a sensitized film, an optical system comprising three objectives forming a removable unit or whole adapted to furnish pictures of equal size upon the film, a socket in which said unit is mounted, a sleeve fitting in which said socket is adapted to slide, guiding means for said unit adapted to hold said unit in such position that a plane passing through the optical axes of the three objectives shall be parallel with the plane in which the film is displaced at the film gate, means for simultaneously centering the three objectives, of a rack integral with the said socket which slides in said sleeve or fitting, and a pinion meshing with the said socket for causing the socket to slide in said sleeve or fitting and simultaneously focus the said three objectives.

6. In an apparatus for taking cinematographic pictures upon a single film by the three color process, the combination of an inclosure for a sensitized film, an optical system comprising three objectives constituting a removable unit or whole adapted to furnish pictures of equal size upon the film, guiding means for said unit adapted to hold said unit in such position that a plane passing through the optical axes of the three objectives shall be parallel with the plane in which the film is displaced at the film gate, means for simultaneously centering the three objectives on the film, an additional lens for simultaneously focussing the objectives having a focal distance in all cases equal to the distance of the object and being of such a diameter that it covers the three objectives together, said additional lens being mounted detachably in front of the objectives.

7. In apparatus for taking cinematographic pictures by the color process, the combination of an inclosure for a sensitized film, an optical system comprising a plurality of objectives, said objectives being mounted as a unit with the plane which passes through the optical axes of the plurality of objectives parallel to the plane of movement of the film at the film gate, and means for simultaneously centering said objectives with respect to the object, or portion of the object and the image which it is desired to photograph on the film.

8. In apparatus for taking cinematographic pictures by the color process, the combination of an inclosure for a sensitized film, an optical system comprising a plurality of objectives, said objectives being mounted as a unit with the plane which passes through the optical axes of the plurality of objectives parallel to the plane of movement of the film at the film gate, and means for simultaneously focussing said objectives, and means for simultaneously centering said objectives with respect to the object, or portion of the object and the image which it is desired to photograph on the film.

In witness whereof I have hereunto signed my name in the presence of two subscribing witnesses.

LÉON GAUMONT.

Witnesses:
 LUCIEN MEMMINGER,
 GABRIEL BELLIARD.